United States Patent
Lindlof

[15] 3,676,387
[45] July 11, 1972

[54] STABLE ELASTOMERIC POLYMER-OIL COMBINATIONS

[72] Inventor: James A. Lindlof, White Bear Lake, Minn.

[73] Assignee: Minnesota Mining and Manfacturing Company, St. Paul, Minn.

[22] Filed: Dec. 21, 1970

[21] Appl. No.: 100,520

Related U.S. Application Data

[63] Continuation-in-part of Ser. No. 701,109, Jan. 29, 1968, abandoned.

[52] U.S. Cl..................260/28.5 B, 260/29.7 GP, 260/33.4, 260/33.6 AQ, 260/876 B, 260/880 B
[51] Int. Cl. ..................C08d 13/22, C08k 1/28, C08f 47/00
[58] Field of Search................260/33.6 AQ, 29.7 GP, 876 B, 260/28.5 B

[56] References Cited

UNITED STATES PATENTS

| | | | |
|---|---|---|---|
| 3,239,478 | 3/1966 | Harlan | 260/33.6 AQ |
| 3,265,765 | 8/1966 | Holden | 260/876 B |

*Primary Examiner*—Theodore Morris
*Assistant Examiner*—T. De Benedictis, Sr.
*Attorney*—Kinney, Alexander, Sell, Steldt & Delahunt

[57] ABSTRACT

A highly elastic synthetic polymer-oil combination meltable at high temperatures for casting from a liquid state, comprising 5 to 30 percent by weight of an unvulcanized elastomeric block copolymer composed of terminal glassy or resinous polymer blocks and a central elastomeric polymer block, and 70 to 95 percent by weight of a stable paraffin oil of low volatility and which has a flash point in excess of the melting temperature of the gel.

10 Claims, No Drawings

STABLE ELASTOMERIC POLYMER-OIL COMBINATIONS

This application is a continuation-in-part of copending application Ser. No. 701,109, filed Jan. 29, 1968 now abandoned.

SUMMARY OF THE INVENTION

The present invention relates to new and useful unvulcanized elastomeric polymer-oil combinations comprising elastomeric block copolymers and non-aromatic paraffinic oils.

According to the present invention there is provided a tough, highly elastic polymer-oil mixture comprised of alternate blocks of elastomeric (B) and non-elastomeric, resinous or glassy thermoplastic (A) polymer blocks in the relationship A-B-A, and aromatic paraffinic oil, which mixture is stable for at least a period of weeks, self-sustaining and sufficiently strong at ambient temperatures to retain its general shape and dimensions and to recover from stretching to more than twice its length to approximately its original dimensions. There is further provided an elastoplastic material of the kind described which melts at high temperatures whereby it can be cast from a liquid state to form a stable material at ambient temperatures. Still further, there is provided a stable elastomeric block polymer and oil elastomeric mixture which can be readily extruded, sprayed, or otherwise shaped in the formation of useful sheets, films, coatings, or molded articles of various kinds.

The polymer-oil elastoplastic combinations of this invention possess very unusual and surprising properties which can be varied by changing the oil content or type of polymer used. For example, the material has a great energy dissipating capability ad thus, forms highly effective cushioning and shock absorbing devices. Materials which gradually exude oils can be provided for use where a source of slow, sustained release of oil is desirable. In contrast with previously known materials categorized as "gels", which generally tear instead of stretch, the materials of this invention are highly elastic.

The compositions of this invention are very flexible and stretchy, having a modulus of elasticity in the range of 1 to 10 psi for 200 percent elongation of a 1 square inch speciman. In most cases the modulus of elasticity is only 1 to 5 psi/in.$^2$ for 200 percent elongation.

Unvulcanized elastomeric block copolymers of the kind useful in the practice of this invention have been known for some time. These polymers are the A–B–A configurations wherein each block A is a glassy or resinous non-elastomeric thermoplastic polymer block with a glass transition temperature above room temperature, i.e., 25° C., having an average molecular weight of between about 2,000 and 100,000 and which is relatively incompatible with the elastomeric polymer block B. B is an elastomeric polymer block of a conjugated diene, the average molecular weight being between about 15,000 and about 1,000,000 (preferably 15,000 to 250,000), and having a glass transition temperature considerably below that of blocks A. This difference in glass transition temperatures may be as small as 15° C., but it is preferably at least 100° C. and more preferably at least about 125° C. The end blocks A of the block copolymer should constitute approximately 10 to 50 percent of the total polymer weight. Such block polymers, and a method for their formation, are described in U.S. Pat. No. 3,265,765 (Holden et al.) issued Aug. 9, 1966 and, in general, these are quite suitable in the practice of the present invention.

Elastomeric block polymers of the type useful in the practice of this invention have been combined with oils to make oil extended rubbers and adhesives. In the formation of adhesives, the amount of oil is generally greater than in oil extended rubbers. The formation of adhesive compositions containing such block polymer tackifying resin and oil is described in U.S. Pat. No. 3,239,478 (Harlan, Jr.) issued Mar. 8, 1966. However, in none of the rubbers or adhesives just described does the amount of oil (compatible plasticizing oil) used constitute ordinarily even as much as 67 percent of the total composition, in as much as extension beyond this point will result in an adhesive with little or no cohesive strength. Further the oils recommended in Harlan are at least partially aromatic and such aromaticity results in a soft flowable material where larger percentages of oil are used for the plasticizing effect. The use of a compatible oil is nonacceptable for purposes of the non-acceptable invention.

When an elastomeric block copolymer of the kind noted herein is combined with a non-aromatic paraffinic oil of low volatility with a flash point above about 350° F. and below about 500° F. wherein the oil constitutes at least about 70 percent of the total weight of the block polymer-oil elastoplastic mixture, that an extremely highly elastic material is obtained which is not only useful as such but which is capable of being melted upon heating for casting in the formation of molded and other articles at room temperatures. Stable elastoplastic materials can be formed where the oil constitutes as much as 95 percent of the combined weight of the oil and elastomeric block polymer. When the amount of the oil is less than about 70 percent the melt viscosity becomes excessive for convenient casting from a hot melt system. When the amount of the oil is greater than about 95 percent, a thixotropic liquid results.

Paraffinic oils, which are normally considered incompatible with block polymers or other rubbers, and thus, not considered extender oils, are somewhat compatible with block copolymers at elevated temperatures (i.e., about 300° F.) to the extent that the oil and the block copolymer form a mixture which when cooled, exhibits a novel structure which is neither gel nor extended polymer, but is rather a continuous web of one-dimensional polymer strands intermingled with a continuous phase of non-compatible oil. Microscopic examination of the oil polymer mixture reveals a sponge-like construction having voids therein filled with oil. The oil may be removed by mechanical means such as pressing, filtering, etc.

This rearrangement of the copolymer structure in heated paraffinic oil is unexpected. When condensed from solution in a suitable solvent for the elastomeric portion of the copolymer, the copolymer forms a three-dimensional network having styrene crystalline domains connected by entangled elastomer segments ad behaves as a reinforced elastomer even when the elastomeric portions are swelled by an oil. When condensed from a solvent such as methyl ethyl ketone, which is a better solvent for the styrene than for the elastomer, a still different block copolymer shell network results which makes the copolymer harder, more brittle and much less elastomeric.

It was as found that finely divided block copolymers or finely divided particles, such as clay, encapsulated in block copolymers can be mixed with a paraffinic oil and the mixture will remain a fluid slurry for extended periods (over a year) at ambient temperature. When heated, the oil and block copolymer then form this unique oil-filled sponge structure. If this is attempted with finely divided copolymer particles and as compatible oil as described in the above-noted Harlan patent, the copolymer will sorb the oil, swell, and the mixture will thicken at ambient temperatures.

The oil used must be incompatible (non-solvent) with the non-elastomeric, thermoplastic polymer block A, should be of low volatility and should have a boiling point in excess of the melting temperature of the polymer-oil combination. For thus purpose, ordinary paraffin-based petroleum oils such as mineral oil, petrolatum, and other paraffin liquid petroleum products within the viscosity range of products commonly called oils are suitable in the practice of this invention. Unsuitable for purposes of the present invention are aromatic, napthenic and cyclic containing oils.

The preferred method of forming the polymer-oil combination involves heating the oil, usually to a temperature around 350° F. and mixing in the desired amount of block copolymer until it is completely melt-mixed into oil Some block copolymers are relatively difficult to mix by this simple technique, and in the case of such polymers it is preferred to first dissolve the block copolymer in a good solvent such as toluol, add this solution to the desired amount of mineral oil, and raise the temperature with mixing and evacuation to boil off the volatile solvent. The resulting solution of block copolymer in oil formed by either of these methods is of a pourable, castable viscosity. Upon cooling of the solution, a soft highly elastic material is formed.

The elastoplastic materials of the present invention can be melted at elevated temperatures, usually in the range of 250° to 400° F., and thus can be cast into pieces of any shape or thickness. This provides a particular advantage where it is desired to form articles having odd or intricate shapes, insoles for boots, ski boot liners, helmet liners, and very flexible exceptionally low modulus material. The elastoplastic materials can be covered with protective skins of elastomeric film or fabric if desired in special applications.

Minor amounts of additives and fillers can be incorporated in the elastoplastic materials without destroying the flexible elastic properties of the material. For example, minor amounts of low melting paraffin waxes can be incorporated in the oil. Such addition generally would increase the modulus of elasticity of the material somewhat, but would still retain the highly elastic flexible, elastic nature of the material. Minor amounts of higher molecular weight elastomers, thermoplastic polymers, etc., can be added to the elastoplastic materials to modify the properties thereof. Generally such additions will be limited to minor amounts not exceeding replacement of more than about one-third of the block copolymer by other polymers. Other additives which are desirable in some cases are pigments to give the desired color to the material, and anti-oxidants to improve the oxidation resistance. Other non-compatible liquids, such as glycols and water, may be added to reduce the amount of oil needed. The additives are preferably added to the hot solution in order to facilitate thorough mixing.

The invention will be further explained with reference to the accompanying examples, wherein all parts are given by weight unless otherwise indicated.

EXAMPLE I

A mixture of 2 parts of a paraffin oil having a flash point of 350° F. (Stanolind Oil No. 11), 2 parts of paraffin wax (melting point 120°–122° F.) were heated until the wax melted and dissolved in the oil. Then one part of styrene-butadiene-styrene block copolymer, having 1 polymer block of 70,000 molecular weight butadiene and 2 polymer blocks of 15,000 molecular weight styrene (Shell Kraton 101), was added. Vigorous stirring and heating continued until the polymer was visibly melted in the oil-wax mixture. The solution was poured into molds to form layers about 1 inch thick. These were allowed to cool. Sections of this material were found to be resilient and elastic. A 12 lb. steel ball was dropped onto a 1 inch sheet of this material which had been placed over carbon paper over a sheet of white bond paper. The ball could be dropped from a height of up to 48 inches with no rebound, and very little image formed on the paper by the carbon paper. This indicated that the material had superior shock absorption properties.

EXAMPLE II

A mixture of 5 parts "Nujol" brand U.S.P. mineral oil and one part styrene-isoprene-styrene block copolymer ("Kraton 107") were heated to approximately 300° F. and agitated vigorously until the polymer appeared visually dissolved. Empty pint bottles were dipped into this hot sol so that a layer approximately 1/16 inch thick was deposited on the bottom rim. These bottles could be filled with water and dropped repeatedly onto concrete floor or steel plates without breakage. By contrast, uncoated, water-filled pint bottles broke when dropped 12 inches onto these surfaces. This indicated a useful potential for shock absorption applications.

EXAMPLE III

A mixture of 7 ½ parts of oleic acid, 1 part of styrene-butadiene-styrene block copolymer ("Kraton 101"), and about 0.05 part $TiO_2$ pigment was heated to approximately 250° F. and vigorously agitated. The copolymer mixed quite rapidly in the hot oil. Some of the hot solution was cast in polyurethane molds into spheres resembling golf balls. These balls upon being thrown against a surface do not rebound, but rather suffer momentary extreme deformation. After brief elapse of time, the balls return to their original shape, and, if on a vertical surface, may continue to adhere or slowly roll down, particularly if the surface is slightly rough. Some of this material was hot melt coated onto polyester sheeting and showed surprisingly strong bond to the polyester film. Such coated film could then adhere to smooth surfaces such as glass, but could be readily removed in contrast to most pressure sensitive tapes which display an aggressive tack.

EXAMPLE IV

A film is prepared by mixing together 100 parts of a styrene-butadiene-styrene block copolymer (Kraton 101), 3 parts pigment grade carbon black, and 200 gms. toluene. This mixture is milled two passes on a three roll paint mill to disperse the carbon black. Thirty parts U.S.P. mineral oil (Drakol 35) is added to the mixture which is then coated onto a silicone release paper using a doctor blade with an orifice set at 20 mils. This film is dried by passing it through an oven. A bubble polymer-oil mixture is prepared by heating 34 parts by weight mineral oil with 6 parts by weight Kraton 107, a block copolymer of styrene-isoprene-styrene. This mixture is heated and stirred until the Kraton is totally mixed in the mineral oil and the temperature raised to approximately 350° F. At this point 7.62 parts by weight hollow glass microspheres having a density of 0.21 grams per milliliter and having an average diameter of approximately 80 microns are added. Further evacuation and mixing are continued to remove any entrained air. This mixture is cast hot onto the surface of a release paper. A film similar to that onto which the polymer-oil combination was cast but having fabric laminated thereto, is applied to the top surface while the mixture is still hot. When cooled, the release paper is removed from the skin on each side of the slab of material. The material is useful as an insulation material, for example in thermally protective clothing and has particular application for use as diving suits for deep submergence diving.

EXAMPLE V

A polymer-oil combination having the following composition was prepared:

| | Parts |
|---|---|
| Kraton 101 | 10 |
| Mineral oil (U.S.P.) | 85 |
| Elastomeric ethylene-propylene terpolymer of high molecular weight ("Royalene 301," a product of Uniroyal, Inc.) | 5 |

The polymer-oil combination was made by dissolving the "Royalene 301" in hexane in the ratio of 10 parts "301" to 1 part hexane, and mixing this solution with a 33 percent solution of Kraton 101 in toluol. The mineral oil was added and the mixture was heated to 350° F. and evacuated at approximately 10 mm/Hg for about ½ hour to remove volatile solvents. The resultant liquid was cast onto release paper in a flat mold to make a flat sheet ⅜ inch thick. The sheet was self-sustaining and returned approximately to its original dimensions after having been stretched to over four times its original length. From the ease of stretching, the modulus of elasticity was judged to be no more than about 5 psi for 200 percent elongation of a 1 square inch cross section. The addition of the "Royalene 301" was found to reduce the rate at which oil bleeding from the sheet occurred.

EXAMPLE VI

A mixture of 7 ½ parts of Stanolind No. 11 (described in Example I) and one part of Kraton 101 block copolymer were heated to about 275°F. and stirred for several hours until the melt viscosity had decreased indicating mixture formation. This hot mixture was poured into a wooden mold and allowed to cool to form a pad 16 × 16 by 2 inches thick. This pad could be placed over surface irregularities as much as 1 inch high and yet a person sitting on it could experience no feeling of discomfort. The polymer-oil combination appears to be of such low modulus as to transmit applied forces in a hydraulic manner, almost equally in all directions. The pad was useful as a cushioning device for preventing bed sores on bedridden persons.

What is claimed is:

1. A synthetic polymer-oil elastomeric combination which is stable at ambient temperatures and meltable for casting in a liquid state at elevated temperatures, comprising, in combination, 5 to 30 weight percent of an A–B–A type unvulcanized elastomeric block copolymer wherein each A block is a glassy or resinous, nonelastomeric, thermoplastic polymer block with a glass transition temperature above room temperature and having an average molecular weight of between about 2,000 and 100,000, the end blocks A of the block copolymer constituting approximately 10–50 percent of the total polymer weight, and the B block is an elastomeric polymer block of a conjugated diene having an average molecular weight between about 15,000 and 1,000,000 and having a glass transition temperature below that of the A block; and 70–95 weight percent of a stable, nonaromatic paraffin oil of low volatility and having a boiling point in excess of the melting temperature of the said elastomeric block copolymer.

2. The elastomeric combination of claim 1 wherein each A of said block copolymer is a non-elastomeric polymer block having an average molecular weight of 2,000 – 100,000 and a glass transition temperature above about 25° C., and B is an elastomeric conjugated diene polymer block having an average molecular weight greater than about 15,000 and a glass transition temperature below about 10° C., the A content being about 10–50 percent by weight of the copolymer.

3. The elastomeric combination of claim 2 wherein said oil is mineral oil.

4. A flexible, soft, polymer-oil elastomeric combination comprising a nonaromatic paraffin oil and a block copolymer of the type $$A'-B-A$$

wherein each A is a thermoplastic polymer block with a glass transition temperature above room temperature having an average molecular weight between about 5,000 and 125,000, the end blocks A of the block copolymer constituting approximately 10–50 percent of the total polymer weight, and B is a polymer block of a conjugated diene having an average molecular weight between about 15,000 and 1,000,000 said oil being uniformly distributed throughout said polymer in an amount sufficient to provide between about 80 to 95 percent by weight oil and 5 to 20 percent by weight of block-copolymer, said combination having a modulus of elasticity of 1 to 10 psi for 200 percent elongation of a one square inch cross section.

5. An elastomeric combination according to claim 4 wherein said combination contains a low melting paraffin wax having a melting point below 130° F.

6. A flexible, soft polymer-oil elastomeric combination comprising an incompatible, inert liquid oil and block copolymer of the type $$A-B-A$$

wherein each A is a thermoplastic polymer block with a glass transition temperature above room temperature having an average molecular weight between about 5,000 and 125,000, the end blocks A of the block copolymer constituting approximately 10–50 percent of the total polymer weight, and B is a polymer block of a conjugated diene having an average molecular weight between about 15,000 and 1,000,000, said inert liquid being uniformly distributed throughout said polymer in an amount sufficient to provide between 70–95 percent by weight inert liquid and 5–30 percent of block copolymer, said inert liquid being at least one-half nonaromatic paraffin oil, said combination having a modulus of elasticity of 1 to 10 psi for 200 percent elongation of a one square inch cross section.

7. The combination of claim 6 wherein said inert liquid comprises an incompatible glycol and a paraffin oil.

8. The combination of claim 6 wherein said inert liquid comprises water and a paraffin oil.

9. A molded article comprising: a synthetic polymer-oil elastomeric combination which is stable at ambient temperatures and meltable for casting in a liquid state at elevated temperatures, comprising, in combination, 5 to 30 weight percent of an A–B–A type unvulcanized elastomeric block copolymer wherein each A block is a glassy or resinous, non-elastomeric, thermoplastic polymer block with a glass transition temperature above room temperature and having an average molecular weight of between about 2,000 and 100,000, the end blocks A of the block copolymer constituting approximately 10–50 percent of the total polymer weight, and the B block is an elastomeric polymer block of a conjugated diene having an average molecular weight between about 15,000 and 1,000,000 and having a glass transition temperature below that of the A block; and 70–95 weight percent of a stable, nonaromatic paraffin oil of low volatility and having a boiling point in excess of the melting temperature of the said elastomeric block copolymer.

10. The molded article of claim 9 wherein said oil is mineral oil.

* * * * *